(No Model.)

C. SELDEN.
TELEPHONE RECEIVER.

No. 413,308. Patented Oct. 22, 1889.

UNITED STATES PATENT OFFICE.

CHARLES SELDEN, OF BALTIMORE, MARYLAND.

TELEPHONE-RECEIVER.

SPECIFICATION forming part of Letters Patent No. 413,308, dated October 22, 1889.

Application filed January 6, 1885. Serial No. 152,139. (No model.)

*To all whom it may concern:*

Be it known that I, CHARLES SELDEN, a citizen of the United States, and a resident of Baltimore, in the State of Maryland, have invented certain new and useful Improvements in Telephone-Receivers, of which the following is a specification.

My invention relates to the construction of telephone-receivers; and its object is to so construct the receiver that the sounds produced by it shall be of greater volume than is the case with receivers of ordinary construction.

The invention consists in the combination, with a diaphragm or similar vibratory surface, of an air-chamber of variable capacity having an opening or pipe of restricted size arranged to direct air-pulsations upon said diaphragm, and means for varying the capacity of said chamber by the action of a magnet in such way that variations in the capacity shall produce at its opening or mouth amplified pulsations or vibrations, which by acting on the diaphragm shall give to it an amplified movement, and consequently produce a louder sound.

Figure 1:
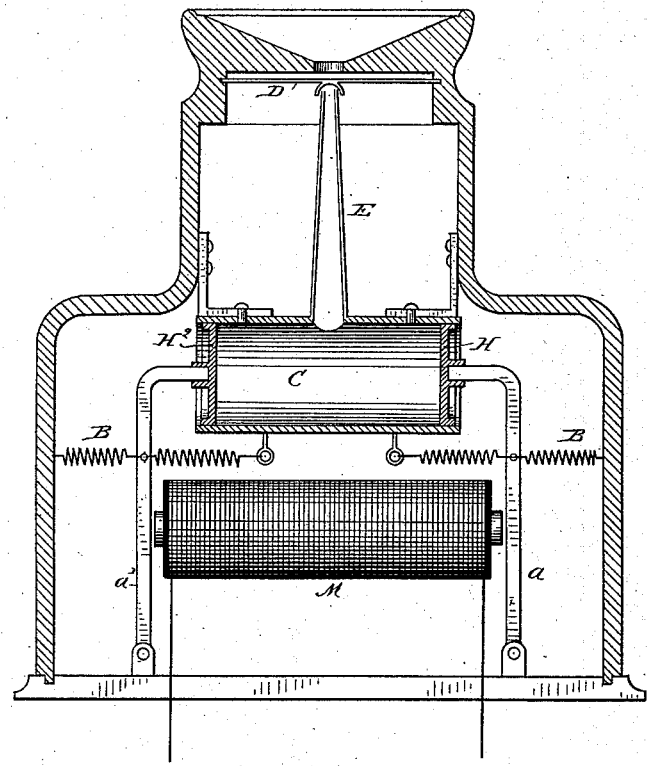
Figure 2:
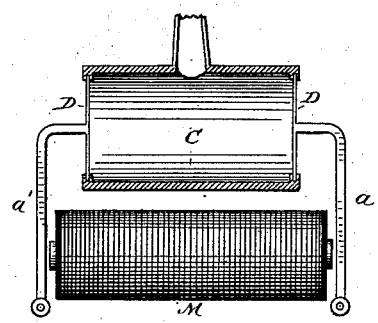

In the drawings, Figure 1, I have shown in partial longitudinal section a form of instrument embodying my invention. Fig. 2 illustrates a modification of detail.

D indicates a diaphragm or similar vibratory plate or surface, of any desired material, adapted to readily vibrate under the action of air-vibrations, and mounted in any suitable frame or support, after a manner well known in the art.

C indicates an air-chamber having an exit pipe or opening E, arranged to direct air-pulsations upon the diaphragm, and of such restricted size or area that the contraction of the cubic capacity of the chamber by any suitable means shall produce in said pipe or opening an amplified movement or vibration of the column of air. The variable capacity in the chamber may be secured by making one or more of its walls movable or vibratory—as, for instance, by making the heads or ends H H² movable in the chamber, after the manner of the piston of a steam-engine in its cylinder, or by making the ends or heads H H², of thin flexible material—as, for instance, of thin sheet-iron, such as is used for the diaphragms of receiving-telephones.

M indicates the electro-magnet of the receiver, and $a$ $a'$ armatures therefor mounted in any suitable or desired manner, so as to be capable of vibrating under the variations of magnetic attraction in the electro-magnet M. The armatures $a$ $a'$ have a bearing upon or are connected to the heads or diaphragms H H² in any desired manner, or through any suitable means, so that their movements will serve to alternately contract and expand the cubical capacity of the air-chamber. Springs of any suitable kind may be applied to the armatures, as is well understood by electricians. Additional magnets may be used, or a magnet of different form may be substituted for that shown.

I do not limit myself to any particular number of armatures, nor to any special way of mounting the same; nor do I limit myself to the particular conformation of the chamber shown or the manner of constructing the same.

In Fig. 2 I have indicated a receiver in which the heads or end walls of the air-chamber consist of elastic diaphragms of thin sheet-iron to which the armatures are connected.

In the operation of the instrument the attraction of the magnet draws the armatures inward, so as to reduce the size of the air-chamber, and as the reduction is of very considerable amount in comparison with the size of the pipe or opening E a quick and strong pulse or vibration of air in the latter occurs that is of sufficient strength to violently affect the diaphragm D. At each vibration of the armature this action takes place, and the result is vibrations of the diaphragm D that are of much larger amplitude than those occurring in the armatures, so that the sounds as received and communicated to the ear of the listener are of much greater loudness than would be produced without the intervention of the devices described.

What I claim as my invention is—

1. In a telephone-receiver, the combination, with an air-chamber having a movable or vibratory wall, of a magnet acting on the same, an air pipe or opening for said chamber having a reduced area, and a diaphragm placed opposite the opening for receiving the air puffs or pulses of augmented force.

2. In a telephone-receiver, the combination of an air-chamber having two movable heads or walls, a magnet or magnets for acting on the same, an exit-pipe, and a diaphragm placed opposite the end of said pipe.

3. A telephone-receiver consisting, essentially, of an air-chamber having movable heads or walls opposite one another, an intermediate magnet acting with its opposite pole ends respectively upon said heads, and a pipe leading from said chamber and arranged to deliver air pulses or vibrations upon a sound-receiving surface or diaphragm.

4. The combination, in a telephone-receiver, of an air-chamber of variable capacity, a magnet or magnets acting on the same, a pipe or opening of reduced size, whereby augmented vibrations or pulses of air may be expelled through said pipe by the action of the magnet in reducing the capacity of the chamber, and a diaphragm or sound-receiving surface placed opposite said pipe or opening.

Signed at Baltimore city, State of Maryland, this 5th day of January, A. D. 1885.

CHARLES SELDEN.

Witnesses:
MURRAY HANSON,
W. H. BERRY.